(12) United States Patent
Chuang (10) Patent No.: US 9,796,106 B1
(45) Date of Patent: Oct. 24, 2017

(54) OIL PRESSURE MOBILE DEVICE FOR A WOOD WORKING MACHINE

(71) Applicant: Bor-Yann Chuang, Taichung (TW)

(72) Inventor: Bor-Yann Chuang, Taichung (TW)

( * ) Notice: Subject to any disclaimer, the term of this patent is extended or adjusted under 35 U.S.C. 154(b) by 0 days.

(21) Appl. No.: 15/437,073

(22) Filed: Feb. 20, 2017

(51) Int. Cl.
| | | |
|---|---|---|
| B27B 5/29 | (2006.01) | |
| B27B 5/10 | (2006.01) | |
| B27B 5/16 | (2006.01) | |
| B62B 3/02 | (2006.01) | |
| F15B 15/16 | (2006.01) | |
| F15B 15/14 | (2006.01) | |
| F15B 15/06 | (2006.01) | |

(52) U.S. Cl.
CPC ............... B27B 5/29 (2013.01); B27B 5/10 (2013.01); B27B 5/16 (2013.01); B62B 3/02 (2013.01); F15B 15/06 (2013.01); F15B 15/149 (2013.01); F15B 15/16 (2013.01); B62B 2205/14 (2013.01)

(58) Field of Classification Search
CPC .... B62B 5/00; B62B 3/02; B62B 5/29; B62B 3/00
See application file for complete search history.

(56) References Cited

U.S. PATENT DOCUMENTS

| | | | |
|---|---|---|---|
| 6,715,979 B1 * | 4/2004 | Theising | A47B 91/002 248/647 |
| 7,112,028 B2 * | 9/2006 | English, Jr. | A47B 91/002 414/458 |
| 7,303,181 B1 * | 12/2007 | Nymann | B66F 5/04 254/2 B |

* cited by examiner

*Primary Examiner* — John Walters
*Assistant Examiner* — James Triggs
(74) *Attorney, Agent, or Firm* — Ming Chow; Sinorica, LLC (57) ABSTRACT

An oil pressure mobile device for a wood working machine is provided in a wood working machine, including a power mechanism and a lifting mechanism. The power mechanism is provided with an oil hydraulic cylinder having its inner wall annularly mounted with a piston fixed with a telescopic rod. The lifting mechanism is disposed with two wheel pressing plates at the underside of the wood working machine. The two wheel pressing plates are jointly provided with a connecting link connected with the telescopic rod, and respectively installed with a moving wheel. Thus, the telescopic rod is driven by the power mechanism to extend or retract and actuate the wheel pressing plates to produce angular variation to make the moving wheels stretch out of the housing of the wood working machine for facilitating shifting of the wood working machine with less labor.

7 Claims, 14 Drawing Sheets

OIL PRESSURE MOBILE DEVICE FOR A WOOD WORKING MACHINE

BACKGROUND OF THE INVENTION

1. Field of the Invention

This invention relates to a mobile device, particularly to an oil pressure mobile device for a wood working machine.

2. Description of the Prior Art

A conventional wood working machine includes a housing having its topside formed with a flat surface, its underside provided with a plurality of fixed seats spaced apart and its interior installed with a motor and a saw blade protruding out of the flat surface of the housing. In using, a board is first placed on the flat surface of the housing and then the board is pushed toward the saw blade for carrying out quick, labor-saving and simple wood sawing operation, thus enhancing convenience of the wood working machine.

However, since the conventional wood working machine is bulky and heavy; therefore, when the wood working machine is to be moved, a crane has to be used for lifting up the wood working machine and then moving the wood working machine to a predetermined place. Nevertheless, the crane is too huge to have the wood working machine moved into a comparatively narrow space and further, employing a crane to move a wood working machine for a short distance not only wastes much cost of manpower but also consumes much time. Therefore, the inventor of this invention observes the above-mentioned shortcomings and thinks that the conventional wood working machine is necessary to be ameliorated and thereupon devises this invention.

SUMMARY OF THE INVENTION

The objective of this invention is to offer an oil pressure mobile device for a wood working machine, able to save labor in shifting of a wood working machine.

The oil pressure mobile device for a wood working machine in the present invention includes a power mechanism and a lifting mechanism. The power mechanism is provided with a storage tank, an operating unit, a driving unit and a control unit. The driving unit is an oil hydraulic cylinder whose cylinder body is connected with an input passage and an output passage, and the cylinder body has its inner wall annularly mounted with a piston fixed with a telescopic rod, which has its free end stretching out of the cylinder body. The lifting mechanism is provided with at least two wheel pressing plates having their fixed ends rotatably secured at the underside of the wood working machine and their intermediate locations together provided with a connecting link that is connected with the telescopic rod, and the wheel pressing plates further have their free ends respectively installed with a moving wheel.

The oil pressure mobile device for a wood working machine in the present invention is to have the power mechanism driving the telescopic rod to extend or retract to make the wheel pressing plates produce angular variation to enable the moving wheels to stretch out of the housing of the wood working machine for facilitating shifting of the wood working machine with less labor.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
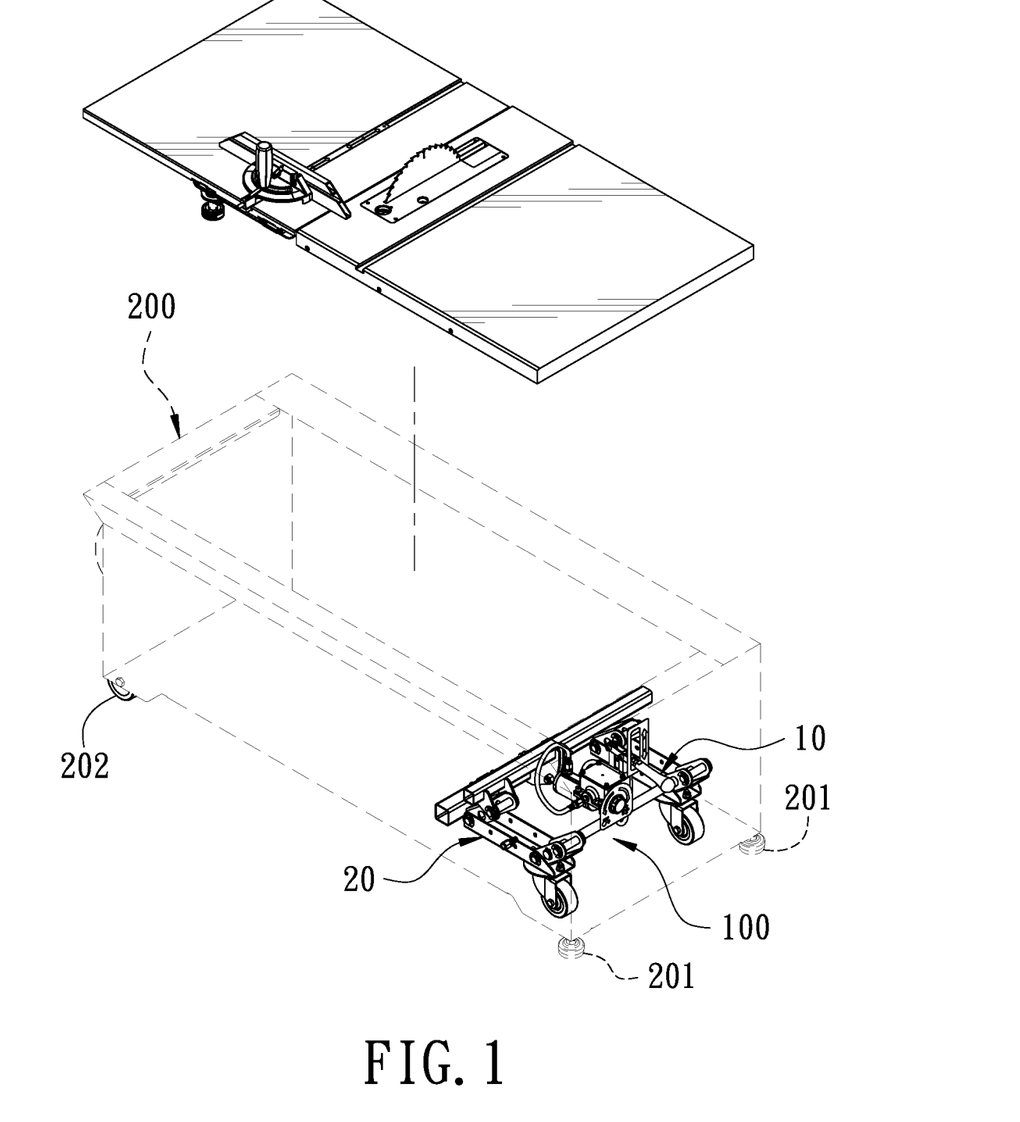
FIG. 1 is a schematic view of a first preferred embodiment of an oil pressure mobile device for a wood working machine in the present invention.

A first preferred embodiment of an oil pressure mobile device 100 for a wood working machine, which is provided in a wood working machine 200 that has its underside disposed with two foot pedestals 201 and two fixed wheels 202, as shown in FIG. 1 includes a power mechanism 10 and a lifting mechanism 20 as main components combined together.

Figure 2:
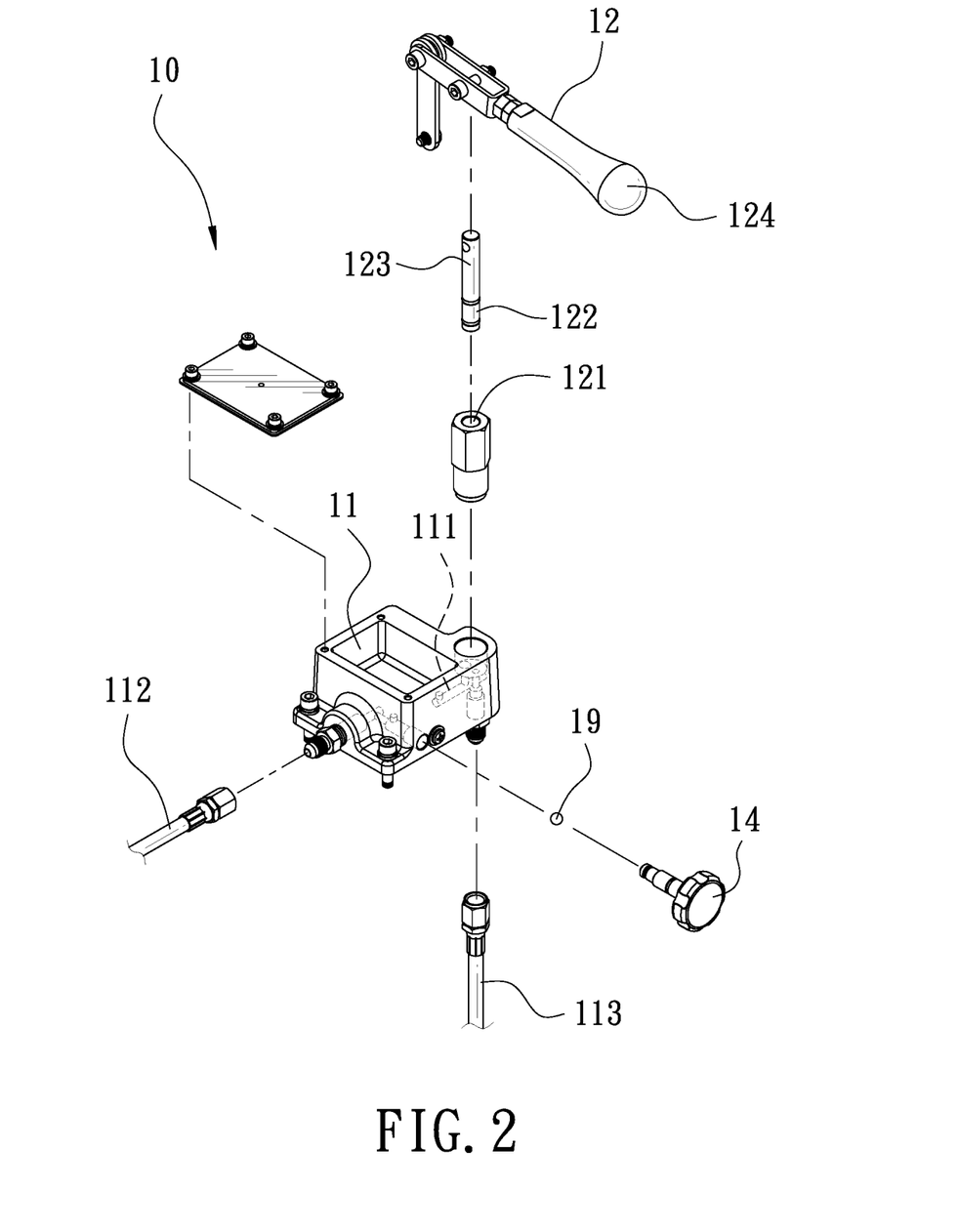
FIG. 2 is a partial exploded perspective view of the first preferred embodiment of a power mechanism in the present invention.
Figure 3:
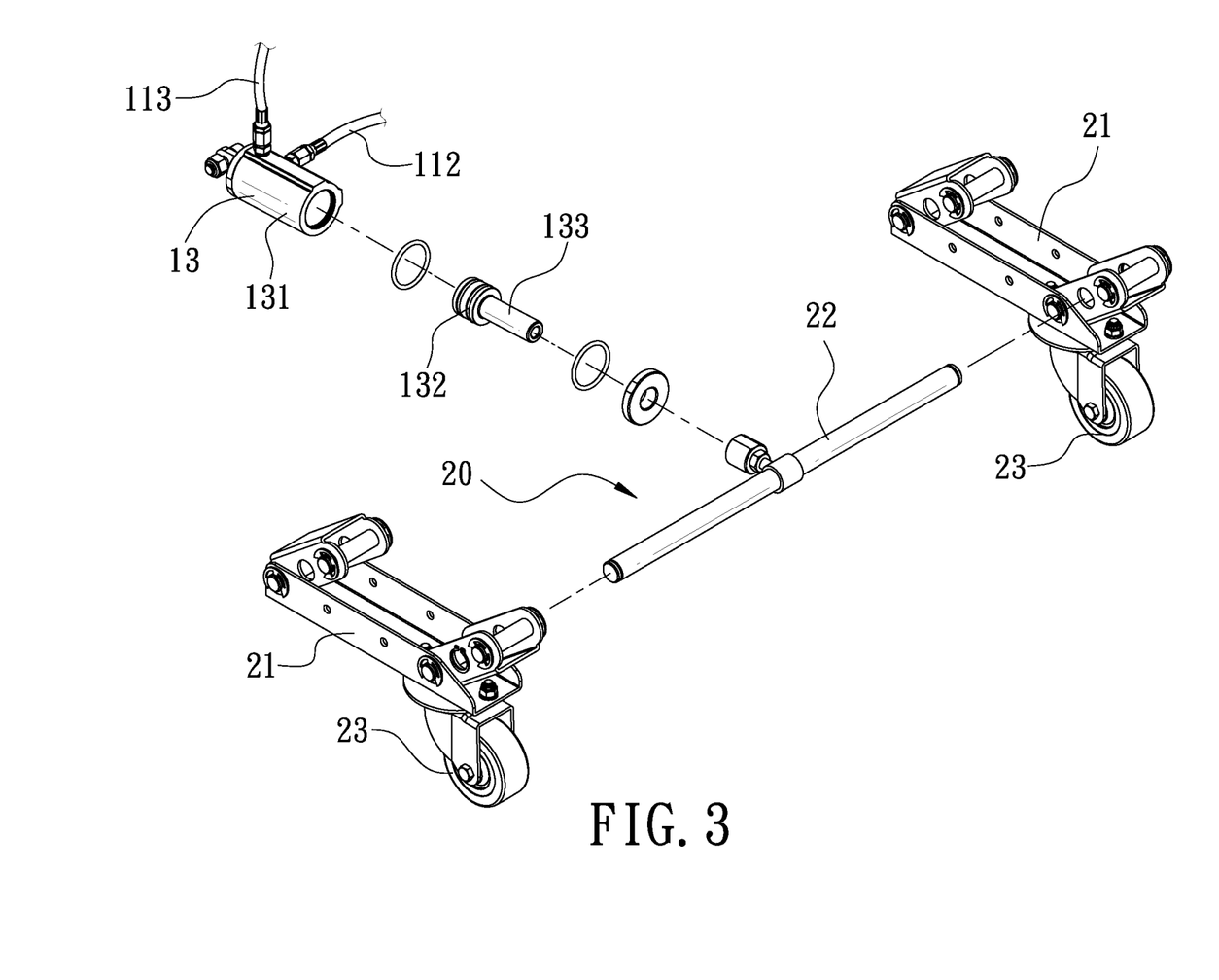
FIG. 3 is a partial exploded perspective view of the first preferred embodiment of a lifting mechanism and the power mechanism in the present invention.
Figure 4:
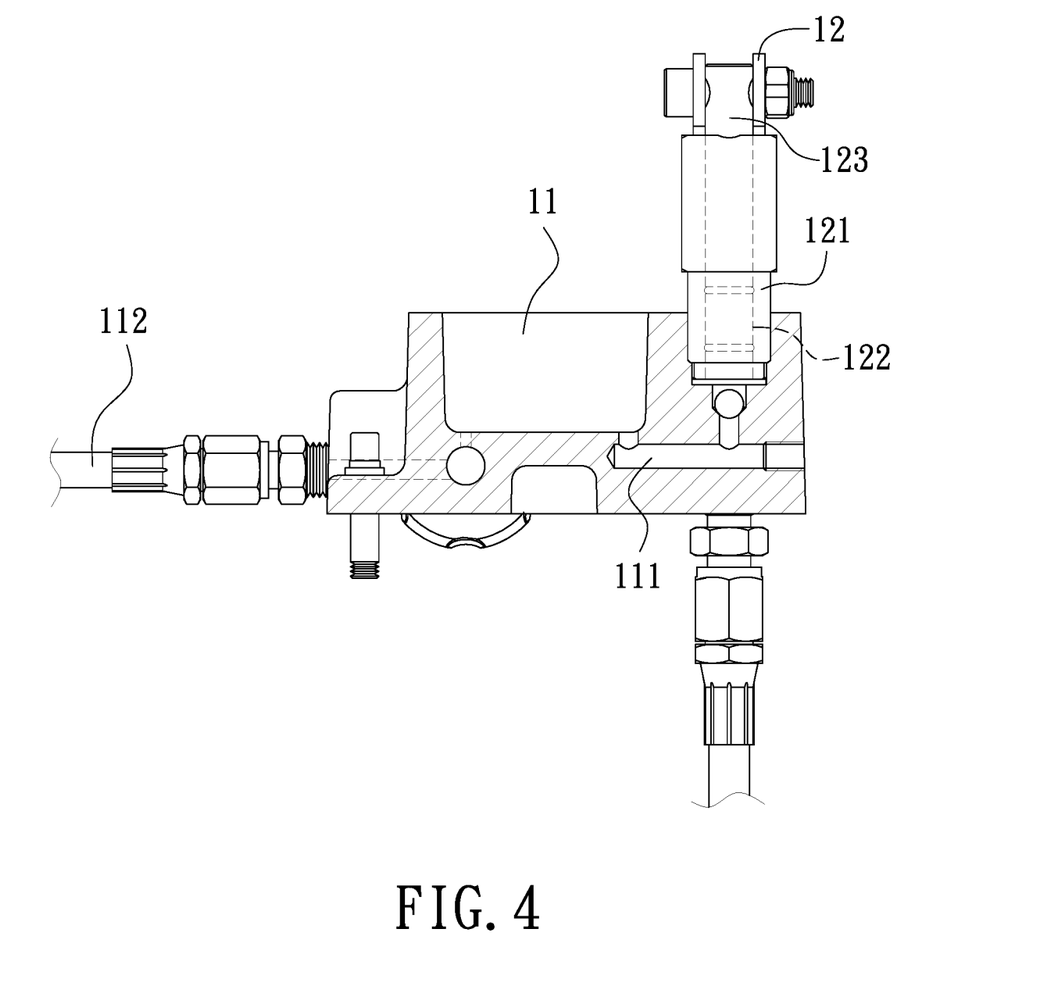
FIG. 4 is a cross-sectional view of the first preferred embodiment of the oil pressure mobile device for a wood working machine in the present invention.
Figure 5:
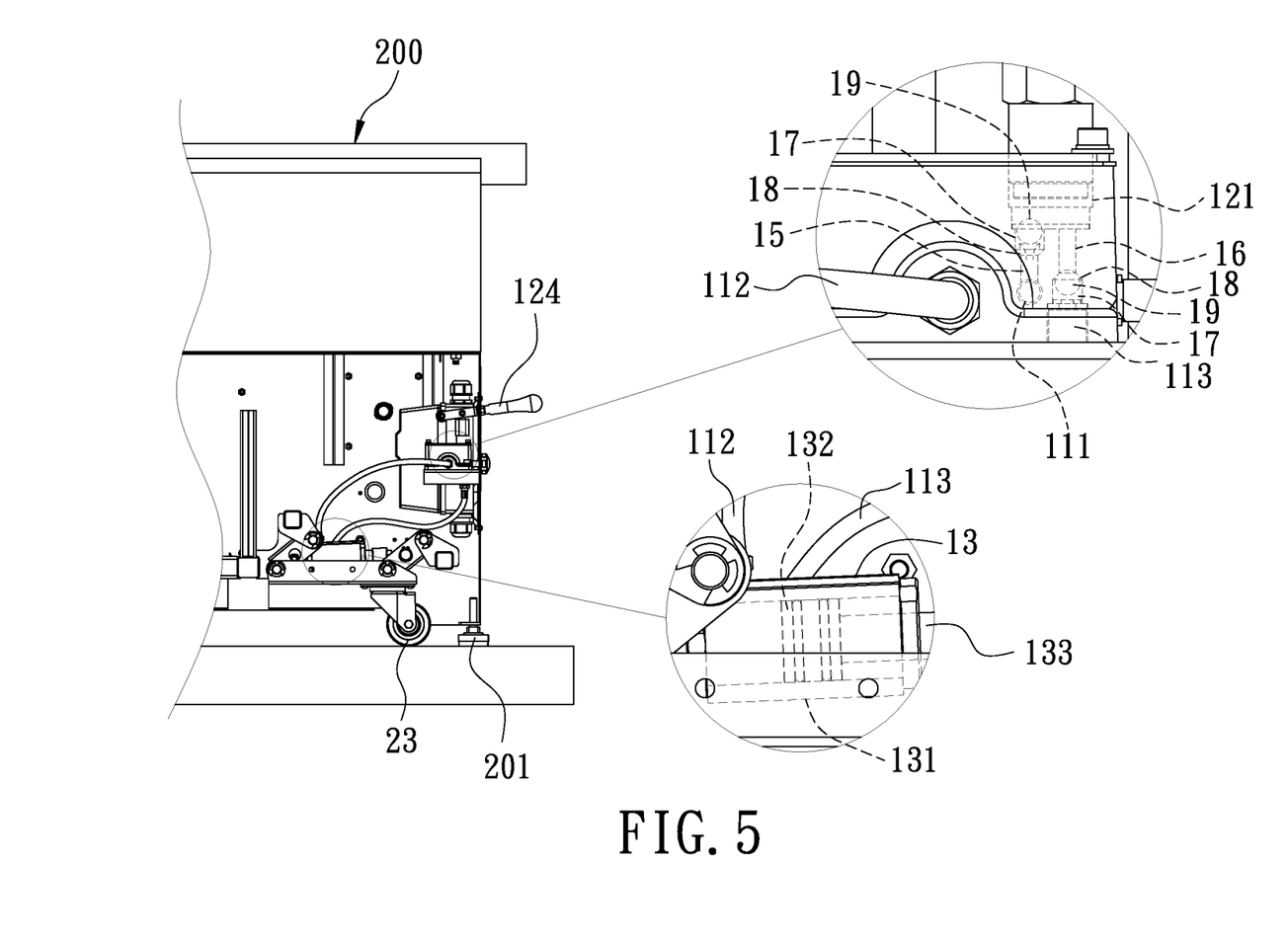
FIG. 5 is a schematic view of the first preferred embodiment of the oil pressure mobile device for a wood working machine in the present invention, showing a state of having hydraulic oil flowing into an accommodating chamber.
Figure 6:
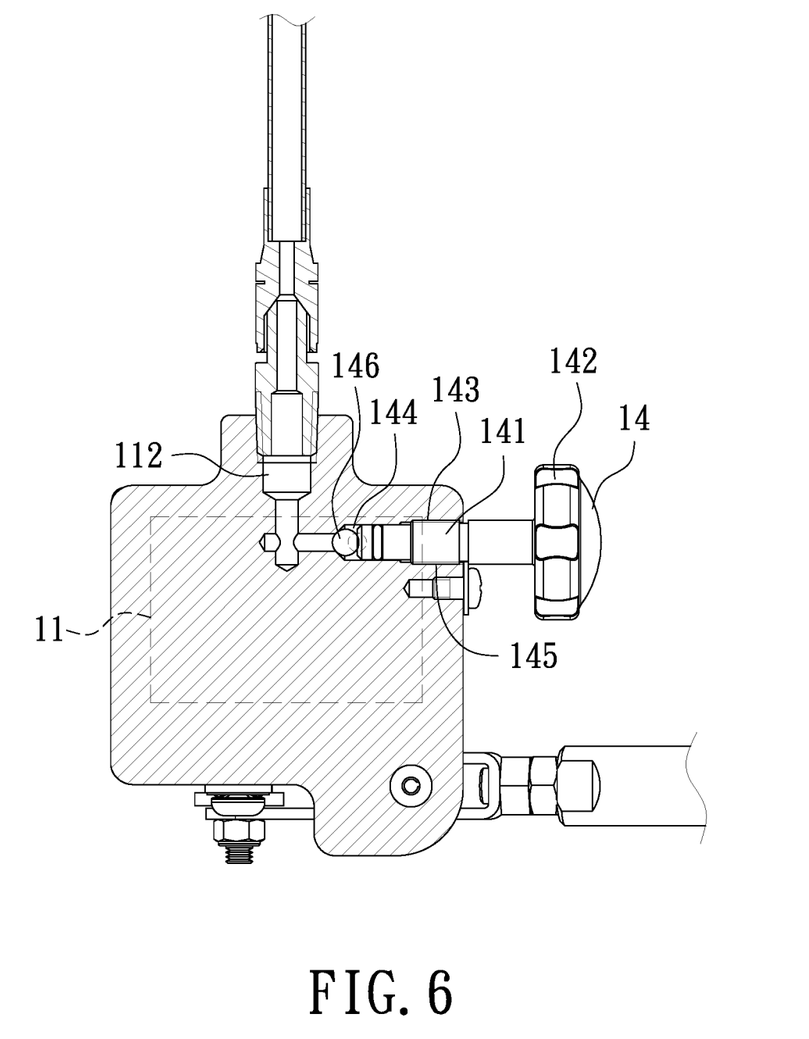
FIG. 6 is a schematic view of the first preferred embodiment of the oil pressure mobile device for a wood working machine in use in the present invention, showing that the switching portion is at a first location.
Figure 8:
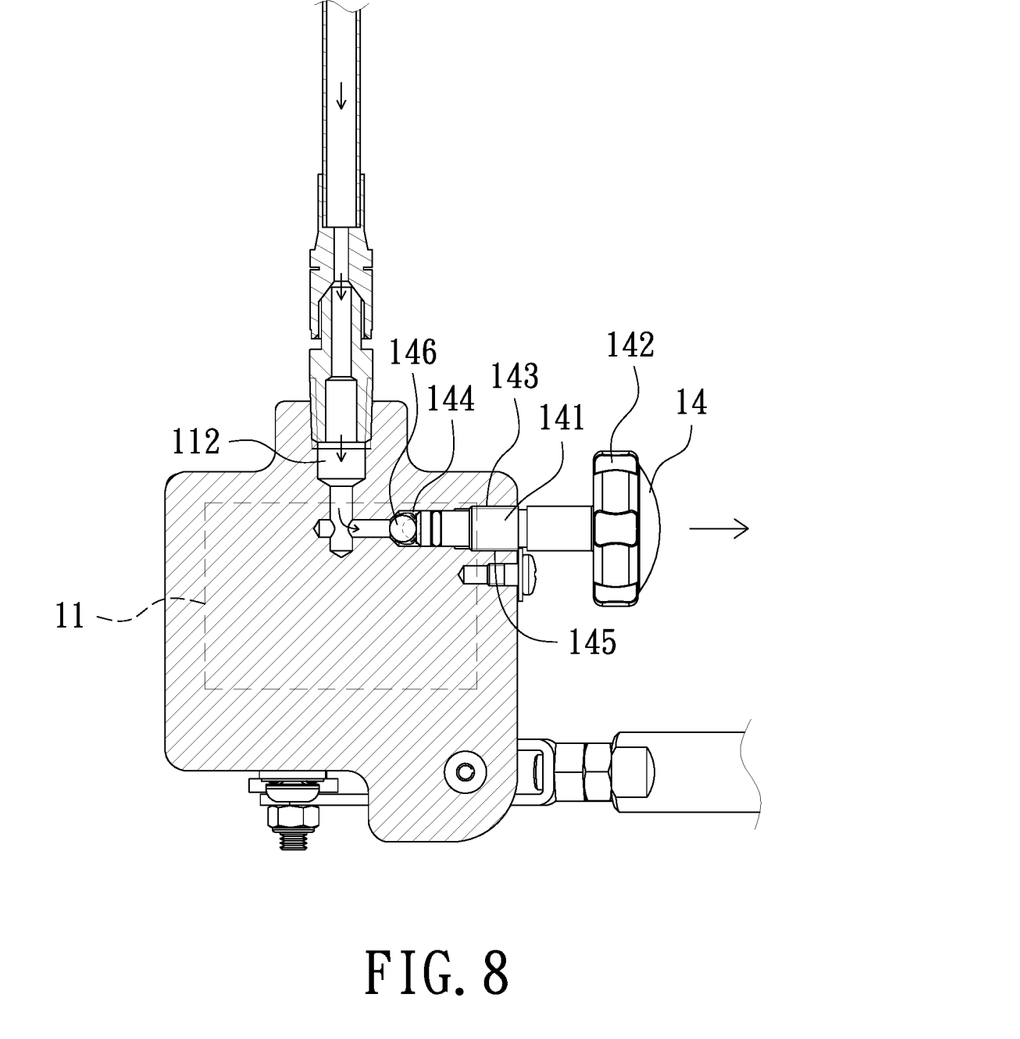
FIG. 8 is a schematic view of the oil pressure mobile device for a wood working machine in use in the present invention, showing that the switching portion is at a second location.

The power mechanism 10, referring to FIGS. 2 and 3, is provided with a storage tank 11, an operating unit 12, a driving unit 13 and a control unit 14. The storage tank 11 is stored therein with liquid, which is hydraulic oil in this preferred embodiment. Further referring to FIG. 4, the storage tank 1 communicates with a connecting passage 111 and an input passage 112, and the operating unit 12 is formed with an accommodating chamber 121 having its inner wall annularly fitted with a pump piston 122 inserted therein with a driving shaft 123, which has a free end connected with a handle 124. Referring to FIG. 5, the accommodating chamber 121 communicates with the connecting passage 111 and an output passage 113, and the connecting passage 111 is provided with a first non-return member 15 and the output passage 113 is provided with a second non-return member 16. The first non-return member 15 and the second non-return member are respectively a funnel type passage and respectively formed with an expanded opening 17, a constricted opening 18, and a ball 19. The diameter of the ball 19 is slightly larger than the minimum internal diameter of the constricted opening 18, and the expanded opening 17 of the first non-return member 15 is provided toward the accommodating chamber 121, while the constricted opening 18 of the second non-return member 16 is provided facing the accommodating chamber 121. The driving unit 13 is an oil hydraulic cylinder having a cylinder body 131 connected with both the input passage 112 and the output passage 113. The cylinder body 131 has its inner wall annularly mounted with a piston 132 inserted therein with a telescopic rod 133, which has a free end protruding out of the cylinder body 131. Continuously referring to FIG. 6, the control unit 14 positioned at the input passage 112 consists of a blocking portion 141 and a switching portion 142 and in this preferred embodiment, the control unit 14 further contains a valve passage 143 communicating with both the input passage 112 and the storage tank 11 and formed with an expanded opening 144 and a threaded hole 145 communicating with the expanded opening 144. The threaded hole 145 is threadably combined with the blocking portion 141, which is a screw rod having one end secured with the switching portion 142 that is a turning knob, and another end pushing against a ball 146. When the switching portion 142 is at a first location, the blocking portion 141 will push the ball 146 to block up the expanded opening 144 and when the switching portion 142 is at a second location, the input passage 112, the valve passage 143 and the storage tank 11 will communicate with one another, as shown in FIG. 8.

The lifting mechanism 20 is provided with at least two wheel pressing plates 21, which have their fixed ends rotatably secured at the underside of the wood working machine and their intermediate locations jointly provided with a connecting link 22 connected with the telescopic rod 133 and further have their free ends respectively installed with a moving wheel 23. Thus, the telescopic rod 133 can be driven by the power mechanism 10 to extend or retract and actuate the wheel pressing plates 21 to produce angular variation.

Referring to FIGS. 1, 2 and 5, under normal state, the wood working machine 200 is fixed on a flat surface by means of the foot pedestals 201 and the fixed wheels 202. To move the wood working machine 200, further referring to FIG. 6, firstly, have the switching portion 142 switched to a first position to have the blocking portion 141 screwed with the threaded hole 145 and pushing the ball 146 to block up the expanded opening 144 and then, pull the handle 124 upward to drive the driving shaft 123 to actuate the pump piston 122 to shift upward to pump the hydraulic oil of the storage tank 11 to flow into the first non-return member 15 through the connecting passage 111. At this time, the expanded opening 17 and the ball 19 of the non-return member 15 will produce a gap therebetween to enable the hydraulic oil to flow into the accommodating chamber 121.

Figure 7:
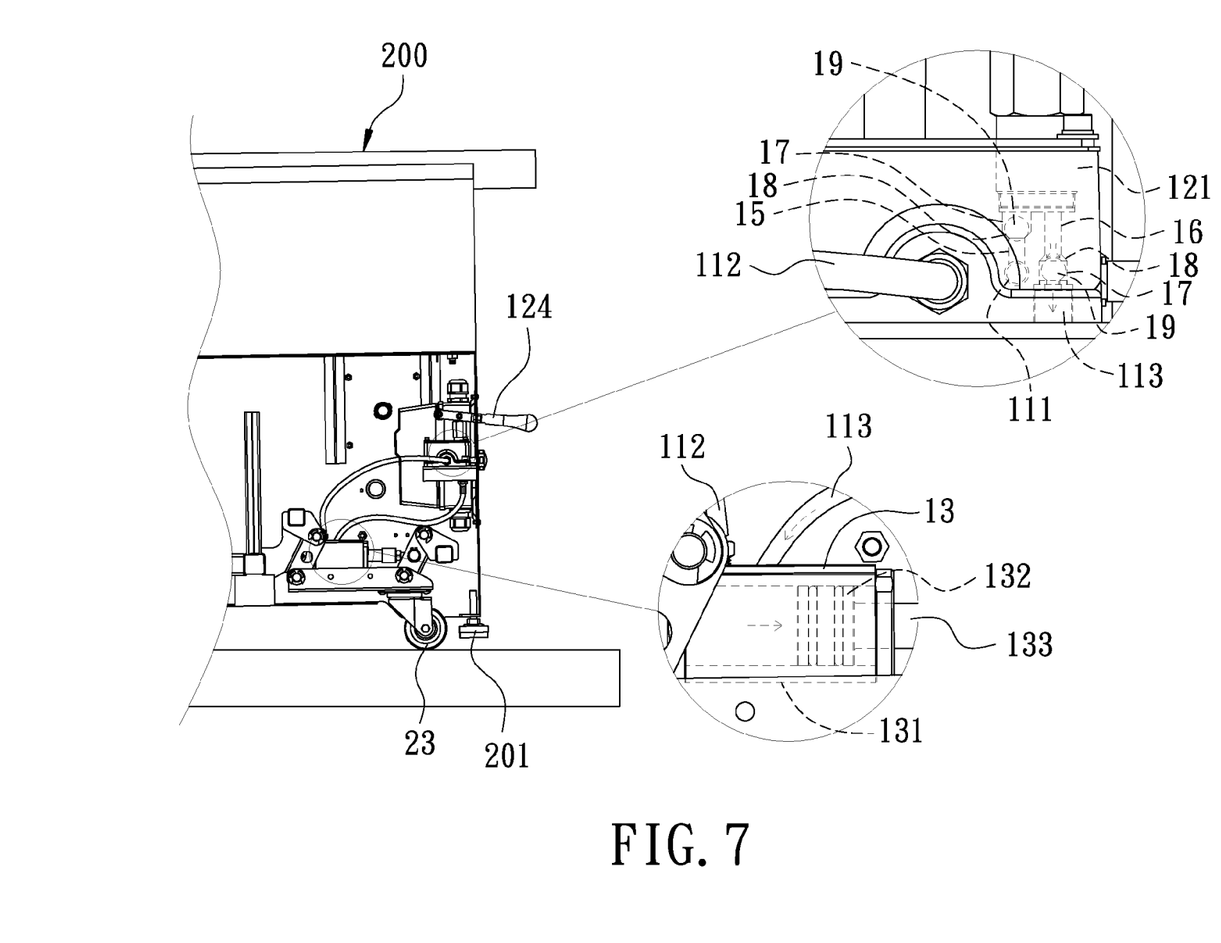
FIG. 7 is a schematic view of the first preferred embodiment of the oil pressure mobile device for a wood working machine in use in the present invention, showing a state of pumping hydraulic oil into an oil hydraulic cylinder.

Referring to FIGS. 2, 3 and 7, when the handle 124 is pressed down, the driving shaft 123 will drive the pump piston 122 to push the hydraulic oil in the accommodating chamber 121 to flow to the second non-return member 16 to make the ball 19 and the output passage 113 produce a gap therebetween to enable the hydraulic oil to flow into the cylinder body 131 of the driving unit 13 through the output passage 113. At this time, since the ball 19 of the first non-return member 15 blocks up the constricted opening 18; therefore, the hydraulic oil will not flow back to the storage tank 11 via the connecting passage 111 and further, since the ball 146 blocks up the expanded opening 144; therefore, the hydraulic oil is impossible to flow into the storage tank 11 via the input passage 112 and thus, the hydraulic oil can smoothly flow into the cylinder body 131 and impossible to flow backwards.

When the handle 124 is continuously pulled upward, the ball 19 of the second non-return member 16 will block up the constricted opening 18; therefore, the hydraulic oil will not flow back to the accommodating chamber 121 through the output passage 113, rendering the hydraulic oil of the cylinder body 131 impossible to flow back to the accommodating chamber 121. Through foresaid steps, the hydraulic oil can continuously flow into the cylinder body 131 for driving the piston 132 to push out the telescopic rod 133 and simultaneously, the telescopic rod 133 will actuate both the connecting link and the wheel pressing plates 21 to let the wheel pressing plates 21 produce angular variation and make the moving wheels 23 pushed out of the wood working machine 200 and press against the flat surface. Thus, an operator can save labor in pushing and moving the wood working machine 200 via the moving wheels 23.

Referring to FIGS. 3, 5 and 8, after the wood working machine 200 is moved to a predetermined location, the switching portion 142 can be switched to a second position. At this time, the weight of the wood working machine 200 will impel the hydraulic oil to flow into the expanded opening 144 of the valve passage 143 through the input passage 112 to let the ball 146 and the expanded opening 144 produce a gap therebetween to enable the hydraulic oil to flow back to the storage tank 11. In the meantime, the piston 132 will retract the telescopic rod 133 and the connecting link 22 to make the wheel pressing plates 21 actuate the moving wheels 23 to retract to the interior of the wood working machine 200 and have the wood working machine 200 fixed in place by means of the foot pedestals 201.

Figure 9:
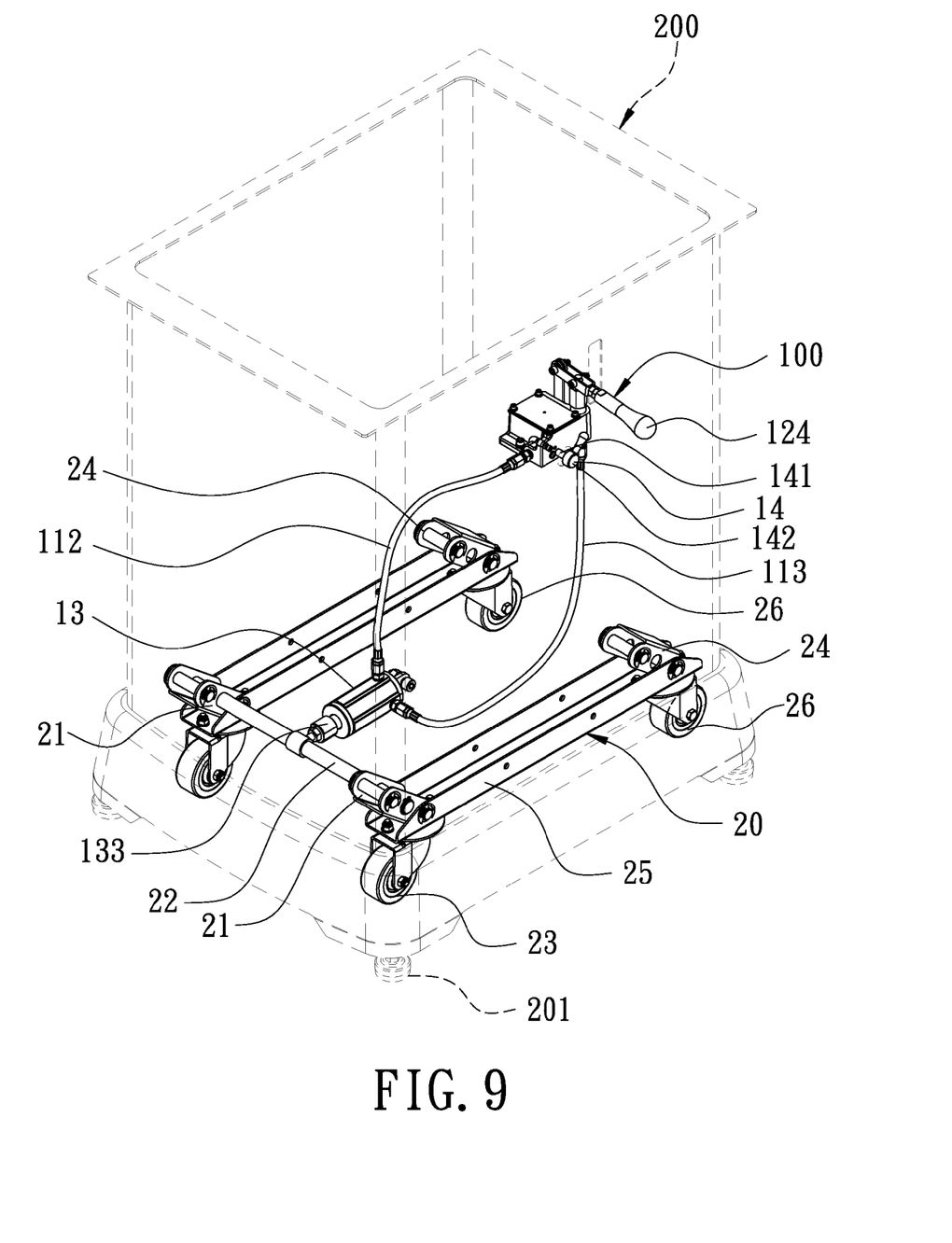
FIG. 9 is a schematic view of a second preferred embodiment of an oil pressure mobile device for a wood working machine in the present invention.
Figure 10:
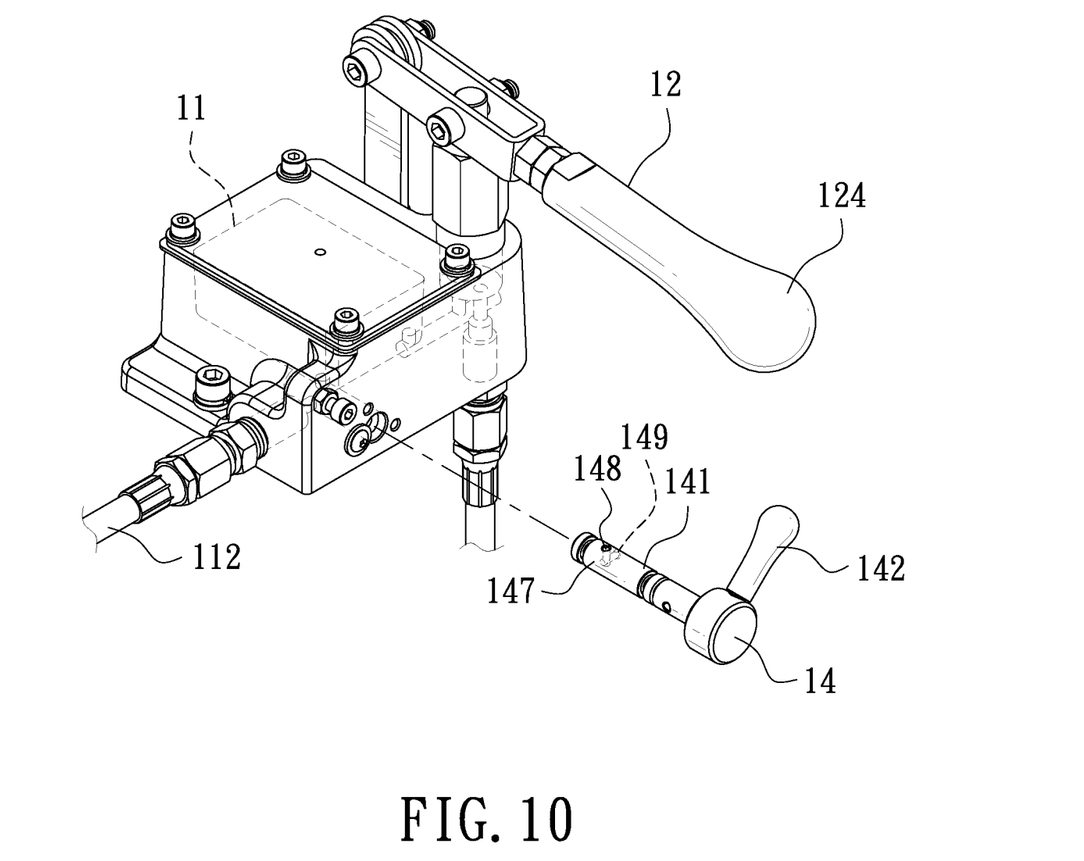
FIG. 10 is a partial exploded perspective view of the second preferred embodiment of a power mechanism in the present invention.
Figure 11:
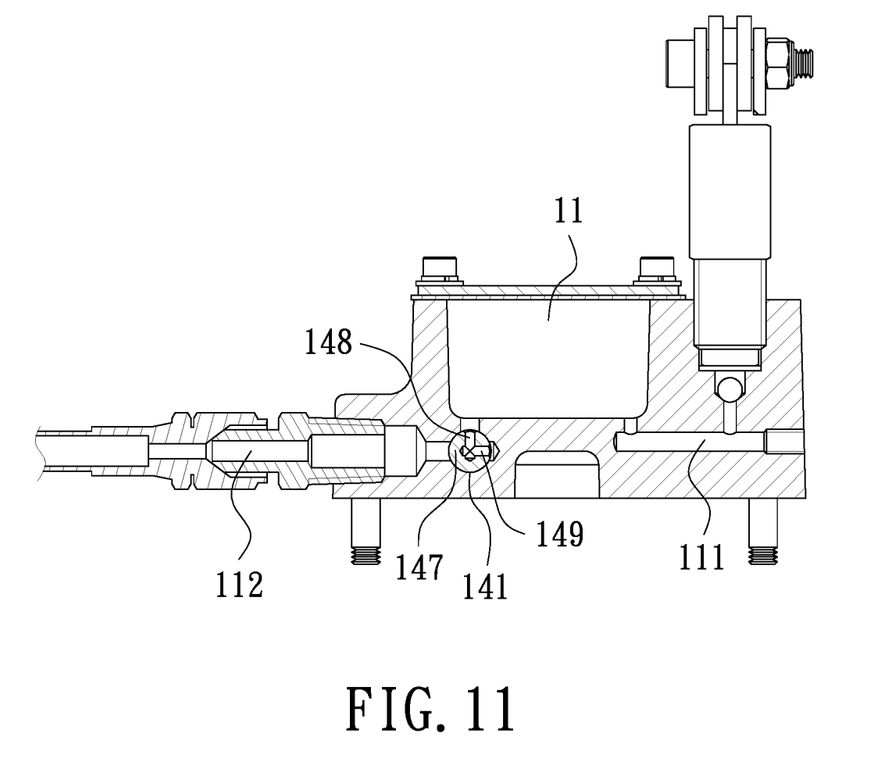
FIG. 11 is a schematic view of the second preferred embodiment of the oil pressure mobile device for a wood working machine in use in the present invention, showing that a switching portion is at a first location.
Figure 12:
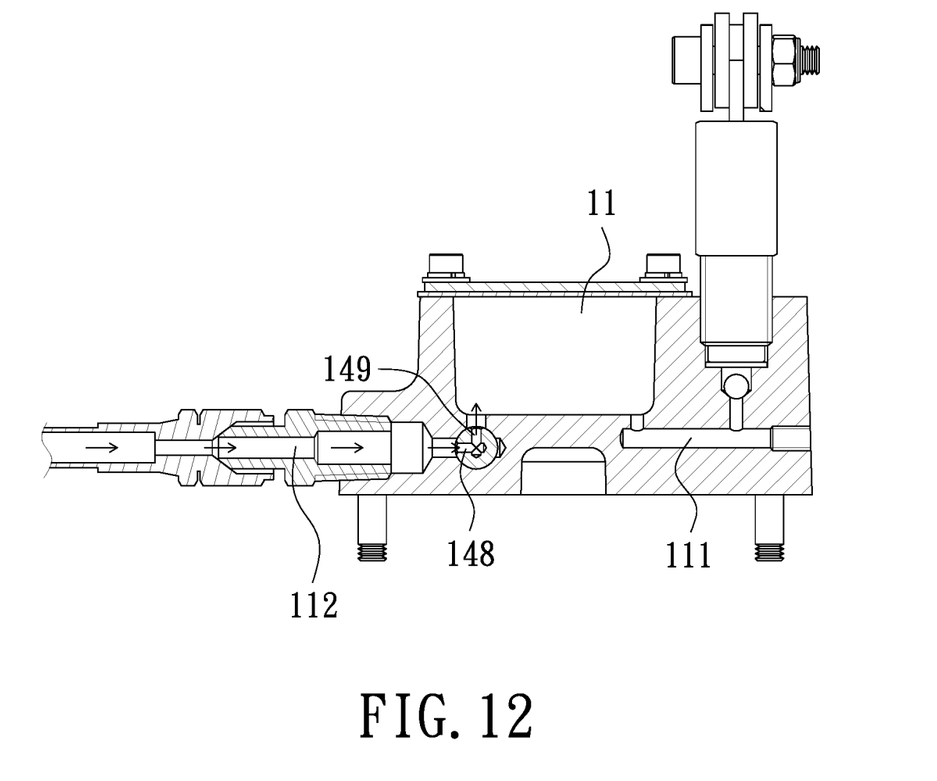
FIG. 12 is a schematic view of the second preferred embodiment of the oil pressure mobile device for a wood working machine in use in the present invention, showing that a switching portion is at a second location.
Figure 13:
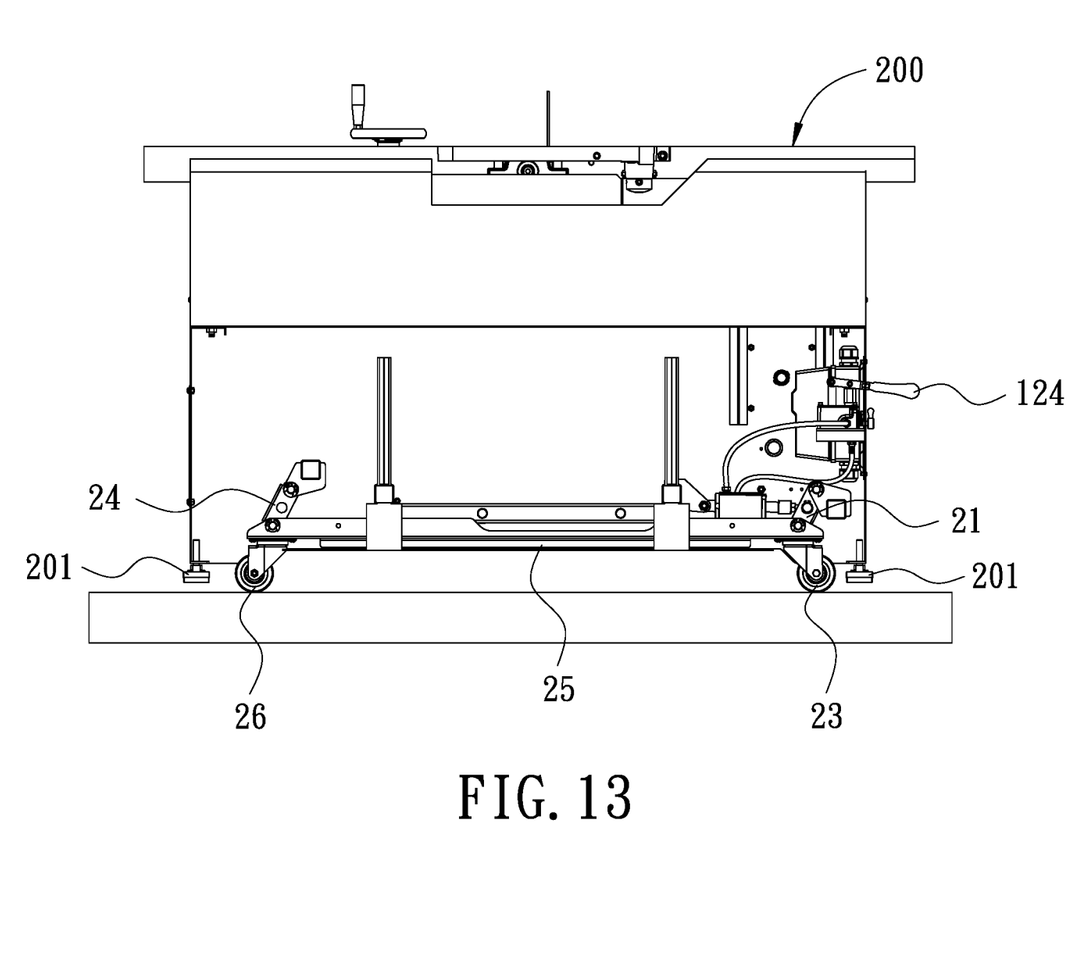
FIG. 13 is a schematic view of the second preferred embodiment of the oil pressure mobile device for a wood working machine in a using state in the present invention, showing that the moving wheels and the auxiliary moving wheels are stretched out of the wood working machine.
Figure 14:
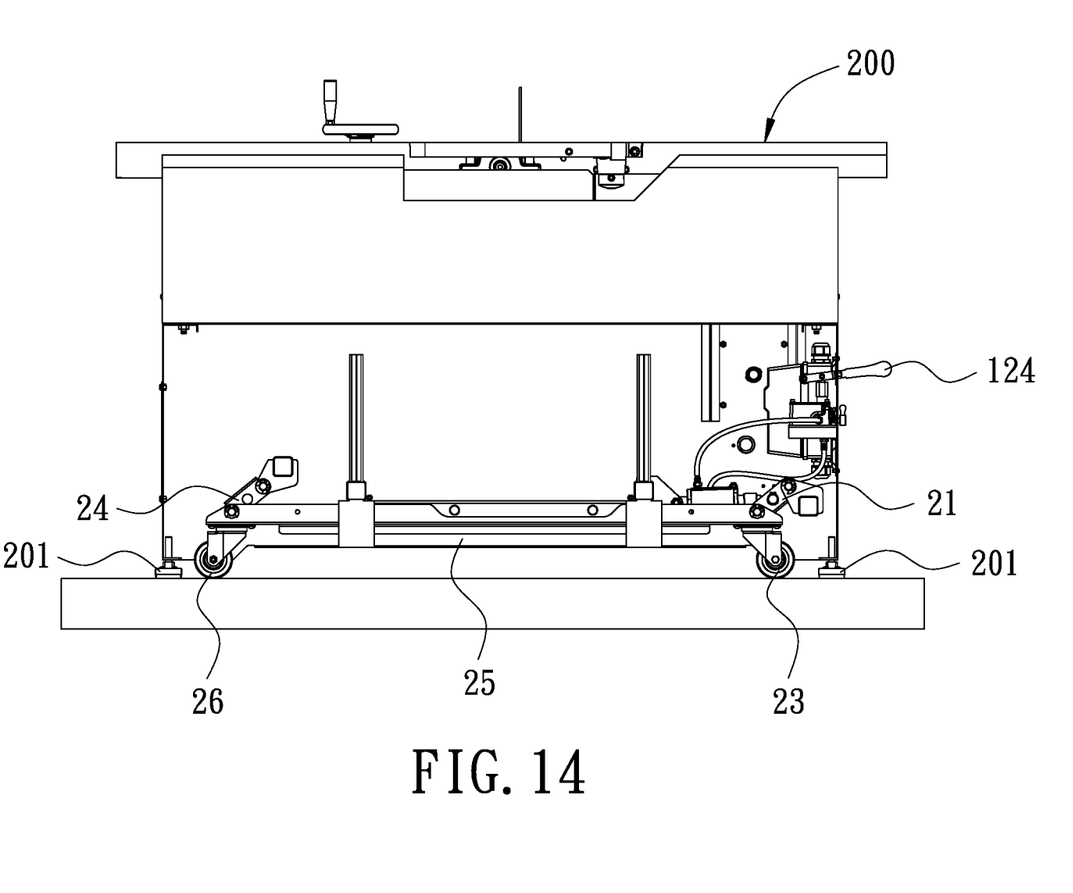
FIG. 14 is a schematic view of the second preferred embodiment of the oil pressure mobile device for a wood working machine in a using state in the present invention, showing that the moving wheels and the auxiliary moving wheels are retracted in the wood working machine.

A second preferred embodiment of an oil pressure mobile device for a wood working machine in the present invention, as shown in FIGS. 9 and 10, is almost the same in structure as that of the first preferred embodiment, except the blocking portion 141, the switching portion 142 and the lifting mechanism 20. The blocking portion 141 of the second preferred embodiment has its outer circumferential surface formed with a stop edge 147, a first open pore 148 and a second open pore 149 communicating with the first open pore 148. When the switching portion 142 is at a first position, as shown in FIG. 11, the stop edge 147 will block up the input passage 112, rendering the hydraulic oil in the input passage 112 impossible to flow into the storage tank 11, and when the switching portion 142 is at a second position, as shown in FIG. 12, the first open pore 148 will communicate with the input passage 112, and the second open pore 149 will communicate with the storage tank 11; therefore, the hydraulic oil can get into the first open pore 148, the second open pore 149 and then flow into the storage tank 11 through the input passage 112. The switching portion 142 of the second preferred embodiment is a turning handle, and lifting mechanism of the second preferred embodiment is further provided with two auxiliary wheel pressing plates 24 having their fixed ends rotatably secured at the underside of the wood working machine 200 and their intermediate locations respectively provided with a connecting rod 25 connected with the wheel pressing plates 21 and further their free ends respectively disposed with an auxiliary moving wheel 26. Moreover, the wood working machine 200 has its underside fixed with plural foot pedestals 201 respectively positioned beside the moving wheels 23 and the auxiliary moving wheels 26 for stably fixing the wood working machine 200 on a flat surface. Thus, when an operator changes over the switching portion 142 to a first position and operates the operating unit 12 to stretch out the telescopic rod 133 of the driving member 13, the wheel pressing plates 21 will actuate the auxiliary wheel pressing plates 24 via the connecting rods 25 to produce angular variation and make the moving wheels 23 and the auxiliary moving wheels 26 stretch out of the wood working machine 200 for facilitating shifting of the wood working machine 200, as shown in FIG. 13. After the wood working machine 200 is moved, the switching portion 142 is switched over to a second position to let the hydraulic oil flow back to the storage tank 11 and make the moving wheels 23 and the auxiliary moving wheels 26 retracted to the interior of the wood working machine 200 and meanwhile, the wood working machine 200 is fixed in place by the foot pedestals 201, as shown in FIG. 14.

While the preferred embodiments of the invention have been described above, it will be recognized and understood that various modifications may be made therein and the appended claims are intended to cover all such modifications that may fall within the spirit and scope of the invention.

What is claimed is:

1. An oil pressure mobile device for a wood working machine comprising:
a power mechanism provided with a storage tank, an operating unit, a driving unit and a control unit, said storage tank stored therein with liquid, said storage tank communicating with a connecting passage and an input passage, said operating unit formed with an accommodating chamber, said accommodating chamber having an inner wall annularly mounted with a pump piston, said pump piston fixed with a driving shaft, said driving shaft having a free end connected with a handle, said accommodating chamber communicating with said connecting passage and an output passage, said connecting passage provided with a first non-return member, said output passage provided with a second non-return member, said driving unit being an oil hydraulic cylinder, said oil hydraulic cylinder having a cylinder body, said cylinder body connected with said input passage and said output passage, said cylinder body having an inner wall annularly fitted with a piston, said piston fixed with a telescopic rod, said telescopic rod having a free end stretching out of said cylinder body, said control unit positioned at said input passage, said control unit comprising a blocking portion and a switching portion, said blocking portion blocking up said input passage when said switching portion is at a first position, said blocking portion opening said input passage when said switching portion is at a second position; and
a lifting mechanism provided with at least two wheel pressing plates, said wheel pressing plates having their fixed ends rotatably secured at an underside of said wood working machine, said wheel pressing plates having their intermediate locations together provided with a connecting link, said connecting link connected with said telescopic rod, said wheel pressing plates having their free ends respectively installed with a moving wheel;
Thus, said telescopic rod driven by said power mechanism to extend or retract for actuating said wheel pressing plates to produce angular variation.

2. The oil pressure mobile device for a wood working machine as claim in claim 1, wherein said first non-return member and said second non-return member are respectively a funnel type passage and respectively formed with an expanded opening, a constricted opening and a ball, a diameter of said ball being slightly larger than a minimum internal diameter of said constricted opening, said expanded opening of said first non-return member provided facing said accommodating chamber, said constricted opening of said second non-return member provided facing said accommodating chamber.

3. The oil pressure mobile device for a wood working machine as claim in claim 1, wherein said control unit further comprises a valve passage, said valve passage communicating with said input passage and said storage tank, said valve passage formed with an expanded opening and a threaded hole communicating with said expanded opening, said threaded hole threadably combined said blocking portion, said blocking portion having one end fixed with said switching portion, said blocking portion having another end pushing against a ball, said blocking portion actuated to push said ball to block up said expanded opening when said switching portion is at a first position, said input passage and said valve passage and said storage tank communicating with one another when said switching portion is at a second position.

4. The oil pressure mobile device for a wood working machine as claim in claim 1, wherein said control unit further comprises a valve passage, said valve passage communicating with said input passage and said storage tank, said valve passage installed with said blocking portion, said blocking portion having one end fixed with said switching portion, said blocking portion having an outer circumferential surface formed with a stop edge, a first open pore and a second open pore communicating with said first open pore, said stop edge blocking up said input passage when said switching portion is at a first position, said first open pore communicating with said input passage, and said second open pore communicating with said storage tank when said switching portion is at a second position.

5. The oil pressure mobile device for a wood working machine as claim in claim 1, wherein the underside of said wood working machine has one side provided with said moving wheels and two foot pedestals and another side installed with two fixed wheels.

6. The oil pressure mobile device for a wood working machine as claim in claim 1, wherein said lifting mechanism is further provided with two auxiliary wheel pressing plates, said auxiliary wheel pressing plates having their fixed ends rotatably secured at the underside of said wood working machine, said auxiliary wheel pressing plates having their intermediate locations respectively provided with a connecting rod connected with said wheel pressing plates, said auxiliary wheel pressing plates having their free ends respectively installed with an auxiliary moving wheel.

7. The oil pressure mobile device for a wood working machine as claim in claim 6, wherein the underside of said wood working machine is provided with plural foot pedestals respectively located beside said moving wheels and said auxiliary moving wheels.

\* \* \* \* \*